United States Patent
Jokschas et al.

(10) Patent No.: US 7,481,319 B2
(45) Date of Patent: Jan. 27, 2009

(54) FILTER DEVICE WITH DEFORMABLE EXPANSION ELEMENT

(75) Inventors: Guenter Jokschas, Murrhardt (DE); Jochen Reyinger, Stuttgart (DE)

(73) Assignee: Mann & Hummel GmbH, Ludwigsburg (DE)

( * ) Notice: Subject to any disclaimer, the term of this patent is extended or adjusted under 35 U.S.C. 154(b) by 280 days.

(21) Appl. No.: 10/927,523

(22) Filed: Aug. 27, 2004

(65) Prior Publication Data
US 2005/0077230 A1  Apr. 14, 2005

(30) Foreign Application Priority Data
Aug. 30, 2003  (DE) ................. 103 40 123

(51) Int. Cl.
*B01D 27/10* (2006.01)
(52) U.S. Cl. ................... 210/349; 210/450
(58) Field of Classification Search ............ 210/349, 210/450, 451, 446, 350
See application file for complete search history.

(56) References Cited

U.S. PATENT DOCUMENTS

| 4,842,737 | A |   | 6/1989 | Reed |
|---|---|---|---|---|
| 5,304,312 | A | * | 4/1994 | Forster et al. ............... 210/808 |
| 5,399,264 | A | * | 3/1995 | Pulek et al. ................. 210/450 |
| 5,536,405 | A | * | 7/1996 | Myrna et al. ........... 210/321.75 |
| 5,685,985 | A | * | 11/1997 | Brown et al. ................ 210/450 |
| 2003/0209482 | A1 | * | 11/2003 | Klotz et al. ................. 210/435 |
| 2004/0094468 | A1 | * | 5/2004 | Fritze ........................ 210/349 |

FOREIGN PATENT DOCUMENTS

| DE | 19746752 | 4/1999 |
|---|---|---|
| JP | 61197013 | 9/1986 |

* cited by examiner

*Primary Examiner*—Terry K Cecil
(74) *Attorney, Agent, or Firm*—Crowell & Moring LLP

(57) ABSTRACT

A filter device for filtering liquids having a filter element situated in a filter housing, with a deformable expansion element being provided in the filter housing so that when it is deformed, the volume of at least one section of the flow path of the liquid to be filtered in the filter housing is variable.

8 Claims, 2 Drawing Sheets

FILTER DEVICE WITH DEFORMABLE EXPANSION ELEMENT

BACKGROUND OF THE INVENTION

The present invention relates to a filter device for filtering liquids having a filter element arranged in a filter housing with the liquid to be filtered flowing through the filter element.

Published German Patent Application No. DE 197 46 752 A1 describes an oil and/or fuel filter having a cylindrical filter insert in a filter housing where the medium to be filtered flows radially through the filter from the outside to the inside. After filtering, the filtered medium is discharged axially from the interior of the filter insert. To ensure that the unfiltered liquid side and the filtered liquid side of the filter insert are separated with a fluid-tight and pressure-tight seal, the axial end faces of the filter insert are sealed with end disks to prevent leakage flows, and a sealing ring is inserted into the central recess in the end face of the filter insert, thereby forming a seal between the filter insert and the adjacent housing.

The filter device disclosed in published German Patent Application No. DE 197 46 752 A1 is particularly suitable for feeding the medium to be filtered radially into the filter housing because the sealing rings inserted into the end face make axial feed of the medium impossible, since the medium would enter directly into the filtered liquid chamber of the filter element.

On the other hand, an axial feed of medium may offer advantages for structural reasons and because such a filter device can be integrated into a pipeline especially easily. In this case, however, the axial end face of the filter element must be sealed liquid-tight with a cover, whereupon the medium that is to be filtered and is introduced into the filter housing flows past the cover of the filter element on the end face and enters an annular space running radially around the filter element, flowing from there radially from the outside to the inside through the filter material.

Problems may occur, however, when the medium to be cleaned has a relatively high freezing point. At cold ambient temperatures, the liquid medium introduced axially into the filter housing may freeze, whereupon the cover may be destroyed due to the expansion of the medium when it freezes, thus also destroying the entire filter element.

SUMMARY OF THE INVENTION

Accordingly, it is an object of the present invention to provide an improved filter device for filtering liquids.

Another object of the invention is to provide a filter device for filtering liquids which will avoid damage to the filter if the liquid to be filtered freezes.

A further object of the invention is to provide a filter device for filtering liquids with deformable elements which allow expansion of the liquid flow path.

These and other objects are achieved in accordance with the present invention by providing a filter device for filtering a liquid comprising a filter element arranged in a filter housing with the liquid to be filtered flowing along a flow path leading through the filter element, further comprising at least one deformable expansion element situated in the filter housing so that the volume of at least one section of the flow path of the liquid to be filtered in the filter housing is variable when the expansion element is deformed.

The filter device according to this invention has an elastically deformable expansion element arranged in a filter housing such that deformation of the expansion element influences the volume of at least a portion of the flow path of the liquid to be filtered. This expansion element may be resilient or capable of elastic yield under the pressure of the fluid, thus allowing the space within the filter housing on the side of the filter element which is in contact with the fluid to be enlarged. Particularly if the medium to be filtered freezes at low temperatures and expands in the process, the deformability of the expansion element ensures that the available volume for the medium will be able to increase, so that very high forces that occur in the freezing process are not applied directly to the filter element and cannot cause destruction of the filter element. The deformability of the expansion element prevents unacceptably high forces from being transferred to the filter element. The filter housing is also protected by the expansion element from unacceptably high forces that could result in the destruction of the filter housing and consequent leakage of the filter.

The expansion element may be arranged in the area of the unfiltered liquid side as well as in the area of the filtered liquid side of the filter element.

According to one advantageous embodiment, the expansion element is situated on the side of the filter element facing the inlet opening in the filter housing. In this embodiment, if the medium introduced into the housing freezes, it blocks off the flow channel between the inlet into the filter housing and the direct oncoming flow side of the filter element, so that the filter material, which is susceptible to damage when exposed to mechanical forces, is protected from direct contact with freezing medium. Incoming flow to the unfiltered liquid side of the filter is thereby interrupted.

Embodiments in which the expansion element bounds a section of the flow path of the fluid to be filtered and undergoes deformation under the pressure of the fluid or ice are possible, as are embodiments in which the expansion element is situated outside of the flow path of the fluid to be cleaned and thus is not in direct contact with the fluid. In particular in the latter case, the filter element is supported relative to the filter housing by the expansion element, so that if the liquid to be filtered freezes, for example, the filter element can be displaced because of the deformability of the expansion element, thereby preventing the filter element from being exposed to unacceptably high forces which might damage it.

The elastically deformable expansion element is preferably made of rubber, in particular an elastomer such as EPDM, for which a Shore hardness of 50±10 has proven advantageous. Alternatively, a foam rubber may also be used as the material of the deformable element.

In one preferred embodiment the expansion element takes the form of an end cover for a cylindrical filter element through which the medium to be filtered flows radially. The resilient expansion element sits on the axial end face closest to the inlet opening through which the medium to be filtered enters the filter, thereby separating the unfiltered liquid side of the filter from the filtered liquid side. This embodiment can be combined particularly well with an axial oncoming flow of the medium to be filtered into the filter housing.

In another preferred embodiment, the filter device is suitable for filtering aqueous urea solutions that are used for reducing nitrogen oxide emissions in the exhaust line of an internal combustion engine. Ammonia released by thermohydrolytic cleavage of the aqueous urea solution is added to the exhaust by injection, leading to a reduction of the nitrogen oxide in the exhaust to nitrogen and water.

Alternatively, however, the filter device of the present invention can be used as a fuel filter or oil filter or for filtering other liquids, particularly in motor vehicles.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
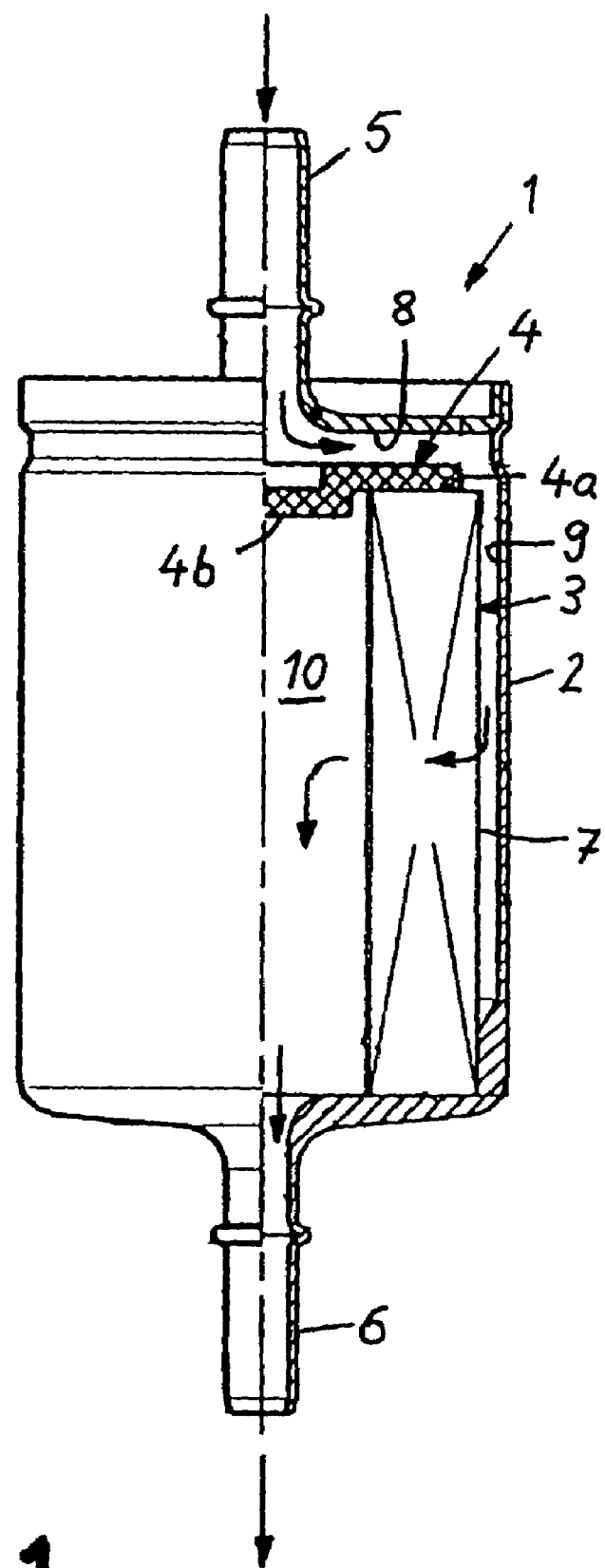
FIG. 1 is a partial longitudinal sectional view of a first filter device according to the present invention.

In the drawings, like components are identified by the same reference numerals.

The filter device 1 shown in FIG. 1 is comprised of a substantially cylindrical filter housing 2 into which the medium to be filtered is introduced axially in the direction of the arrow through the axial inlet opening 5 and the filtered medium is discharged through the axial outlet opening 6 in the direction of the arrow on the opposite end. The medium to be filtered may be any of various types of liquids such as aqueous urea solution, fuels, oil or the like.

A filter element 3 which is also cylindrical and comprises a ring-shaped or annular filter material 7 is provided in the filter housing 2. The liquid to be filtered flows radially through the filter material from the outside to the inside. Accordingly, the unfiltered liquid side is on the outside radially and the filtered liquid side is in the cylindrical interior of the filter element 3. The filter element is advantageously constructed as a replaceable filter element.

The liquid to be supplied axially through the inlet opening 5 enters the filter housing 2 first in an inlet chamber 8 at one axial end which is formed between one of the end faces of the filter element 3 and the adjacent inside wall of the filter housing 2. The fluid introduced can flow out of the inlet chamber 8 on the end into an outer annular space 9 which constitutes the unfiltered liquid side and is formed between the cylindrical inside wall of the filter housing and the cylindrical jacket surface of the filter element. After flowing radially through the filter material 7, the filtered medium is discharged axially through the outlet opening 6 from the cylindrical interior space of the filter element 3, which constitutes the filtered liquid or clean side of the filter.

The end face of the filter element 3 adjacent the inlet chamber 8 is sealed by a cover 4 which separates the unfiltered liquid side from the filtered liquid side of the filter element. The cover 4 forms an expansion element which has a resilient or elastically deformable design. The cover 4 includes an outside annular section 4a which rests on the end face of the annular filter material 7 and a central shoulder 4b, which is offset axially from the outside section and protrudes into the interior space 10 of the filter element 3. The axially offset shoulder 4b facilitates simplified assembly and centering of the cover 4 on the end face of the filter element 3.

The resilience or elasticity of the cover 4 allows elastic deformation and yield when an elevated pressure arises in the inlet chamber 8, e.g., in the case of freezing of the incoming liquid. The deformation of the cover 4 axially toward the interior 10 of the filter element enlarges the volume of the inlet chamber 8 so that, particularly in the case of freezing of the incoming liquid, the increase in volume of the medium caused by the freezing process can be compensated, and unacceptably high forces on the filter element can be avoided. Furthermore when the medium freezes in the axial inlet chamber 8 at the end, the incoming flow to the outer annular space 9 is blocked off, thereby preventing or at least reducing direct contact of freezing liquid with the filter material 7 in the area of the unfiltered liquid side.

The material used for the cover 4 may be rubber, e.g., an elastomer made of EPDM rubber whose Shore hardness is in particular about 50±10. This material permits an increase in the volume of the inlet chamber 8 by approximately 10% without any risk of leakage between the unfiltered liquid side and the filtered liquid side of the filter element.

Figure 2:
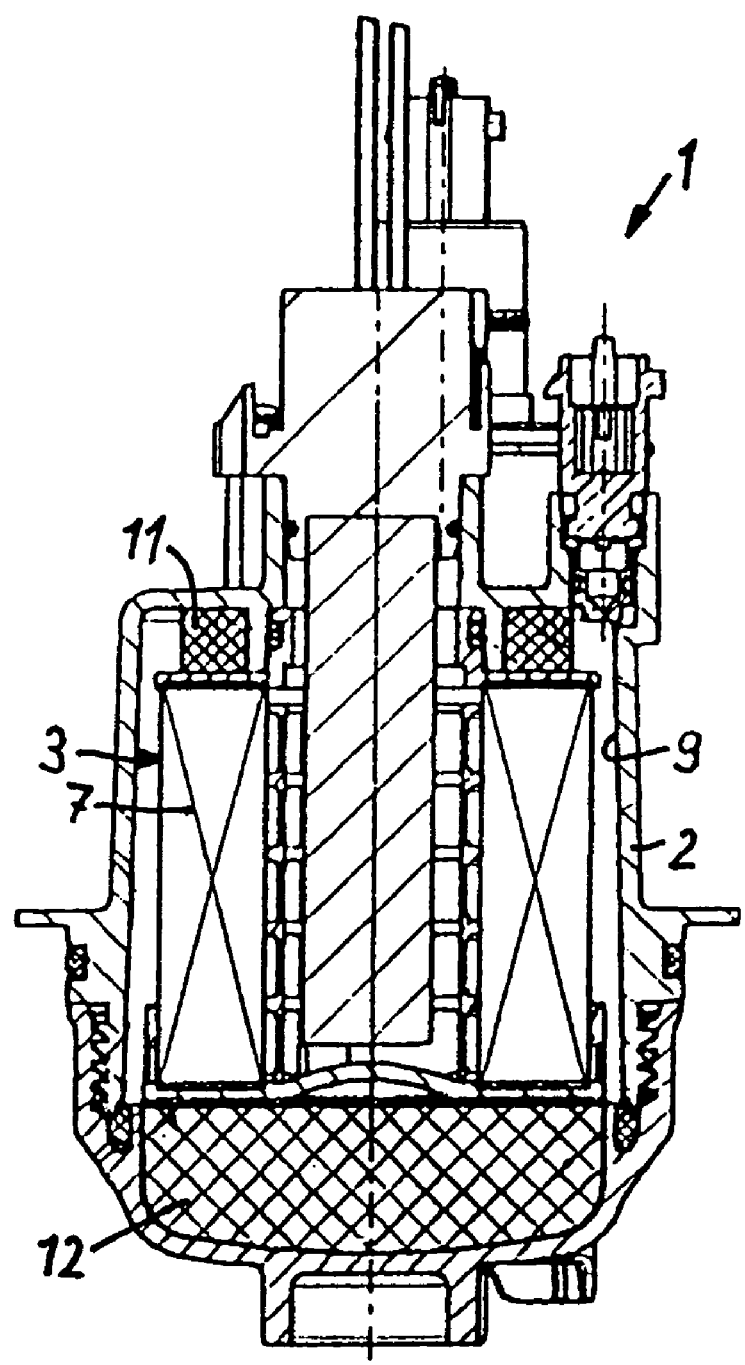
FIG. 2 is a longitudinal sectional view of an alternative filter device embodiment according to the invention.

In the illustrative embodiment shown in FIG. 2, a cylindrical filter element 3 is installed in a substantially cylindrical filter housing 2 with the liquid to be filtered flowing radially through the filter element from the outside to the inside and being discharged axially from the filter element. In the area of the two axial end faces, the filter element 3 is supported axially, and optionally also radially, relative to the housing 2 by expansion elements. The expansion element adjacent the upper end face of the filter element 3 is constructed as a ring 11, and the expansion element at the lower end face is constructed as a bottom disk 12.

The annular space 9 between the inside wall of the filter housing 2 and the lateral surface of the filter element 3 forms the incoming flow side, i.e., the unfiltered liquid side of the filter. When the fluid to be filtered enters the annular space 9, the filter element 3 may yield under the resulting fluid pressure, thereby increasing the volume of the annular space 9 and reducing or eliminating the forces exerted on the filter element 3. In particular when the liquid in the annular space 9 freezes and consequently the medium in the annular space expands, the filter element 3 can yield because it is supported via the expansion elements 11 and 12 in the bottom and/or cover area of the filter element, so the filter material 7 is not destroyed.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter device for filtering a liquid comprising:
   a filter element arranged in a filter housing with the liquid to be filtered flowing along a flow path leading through the filter element; and
   at least one deformable expansion element situated in the filter housing so that the volume of at least one section of the flow path of the liquid to be filtered in the filter housing is variable when the at least one expansion element is deformed,
   wherein the filter element has a cylindrical configuration and a first expansion element forms an imperforate, deformable cover arranged on an axial end face of the cylindrical filter element facing an inlet opening into the filter housing through which a liquid to be filtered enters the filter device, the cover sealing an unfiltered liquid side from a filtered liquid side of the filter element, wherein the cover is axially deformable toward the interior of the filter element based on an elevated liquid pressure in the filter device, and
   wherein a second expansion element is arranged in contact with the filter housing outside the flow path of the liquid to be filtered, and the first and second expansion elements are arranged on opposite sides of the filter element.

2. A filter device according to claim 1, wherein said at least one deformable element is an axial end cover or an annular support ring or an underlying support disk.

3. A filter device according to claim 1, wherein the first expansion element is arranged directly adjacent a section of the flow path of the liquid to be filtered.

4. A filter device according to claim 1, wherein the filter element is supported relative to the filter housing by the second expansion element.

5. A filter device according to claim 1, wherein the at least one expansion element has a Shore hardness of 50 ±10.

6. A filter device for filtering a liquid comprising:

a filter element arranged in a filter housing with the liquid to be filtered flowing along a flow path leading through the filter element; and at least one deformable expansion element situated in the filter housing so that the volume of at least one section of the flow path of the liquid to be filtered in the filter housing is variable when the expansion element is deformed, wherein the filter element has a cylindrical configuration, a first expansion element forms an imperforate, deformable cover arranged on an axial end face of the cylindrical filter element facing an inlet opening into the filter housing through which a liquid to be filtered enters the filter device, the cover sealing an unfiltered liquid side from a filtered liquid side of the filter element, and a second expansion element is a resilient disk made of an elastomeric material, and wherein the second expansion element is arranged in contact with the filter housing outside the flow path of the liquid to be filtered, and the first and second expansion elements are arranged on opposite sides of the filter element.

7. A filter device according to claim 6, wherein the elastomeric material is an ethylene-propylene-diene monomer (EPDM) copolymer.

8. A filter device for filtering a liquid comprising:

a filter element arranged in a filter housing with the liquid to be filtered flowing along a flow path leading through the filter element; and at least one deformable expansion element situated in the filter housing so that the volume of at least one section of the flow path of the liquid to be filtered in the filter housing is variable when the expansion element is deformed, wherein the filter element has a cylindrical configuration and a first expansion element forms an imperforate, deformable cover arranged on an axial end face of the cylindrical filter element facing an inlet opening into the filter housing through which a liquid to be filtered enters the filter device, the cover sealing an unfiltered liquid side from a filtered liquid side of the filter element, wherein the deformable cover has an axially offset central shoulder which protrudes into a central opening in the cylindrical filter element, and wherein a second expansion element is arranged in contact with the filter housing outside the flow path of the liquid to be filtered, and the first and second expansion elements are arranged on opposite sides of the filter element.

* * * * *